Jan. 20, 1925.　　　　　　　　　　　　　　　　　　　　1,523,667
L. J. STEELE ET AL
ELECTRIC ARC WELDING
Filed Jan. 14, 1922　　　7 Sheets-Sheet 1

Inventors
L. J. Steele,
H. Martin and
A. E. McCarthy
by
W. E. Evans
Attorney.

Jan. 20, 1925.                                            1,523,667
L. J. STEELE ET AL
ELECTRIC ARC WELDING
Filed Jan. 14, 1922         7 Sheets-Sheet 2

Inventors
L. J. Steele,
H. Martin, and
A. E. McCarthy:
by
W. E. Evans
Attorney.

Jan. 20, 1925.

L. J. STEELE ET AL

ELECTRIC ARC WELDING

Filed Jan. 14, 1922

Patented Jan. 20, 1925.

1,523,667

UNITED STATES PATENT OFFICE.

LOUIS JOHN STEELE, OF PORTSMOUTH, AND HAROLD MARTIN AND ANDREW EDWARD McCARTHY, OF SOUTHSEA, ENGLAND, ASSIGNORS TO HANDSTOCK LIMITED, OF LONDON, ENGLAND, A CORPORATION OF GREAT BRITAIN AND IRELAND.

ELECTRIC-ARC WELDING.

Application filed January 14, 1922. Serial No. 529,273.

*To all whom it may concern:*

Be it known that we, LOUIS JOHN STEELE, HAROLD MARTIN, and ANDREW EDWARD MC-CARTHY, subjects of the King of Great Britain and Ireland, residing, respectively, at H. M. Dockyard, Portsmouth, in the county of Hants, England, 15 Helena Road, Southsea, in the county of Hants, England, and Lyonsdown, Haslemere Road, Southsea, in the county of Hants, England, have invented certain new and useful Improvements Relating to Electric-Arc Welding, of which the following is a specification.

This invention relates to apparatus for use in a process or method of electric welding with automatic timing and/or control of the arc, which process or method is especially applicable to the fitting of metal studs, tubes or the like, of iron, steel, or brass, to metal bodies, whether forged or cast, such as metal sheets, plates, bars, blocks, forgings and castings.

The process or method consists in the formation of an electric arc between the metal stud or tube or the like and the body or the like to which the stud or the like is to be welded, the maintenance of the said arc for a suitable length of time, the period of which is predetermined and automatically controlled and the subsequent forcing of the end of the molten metal stud or the like against the molten metal body or the like. For convenience of description, the stud or tube or the like is hereinafter referred to as the stud, and the metal body, plate or the like, to which the stud is to be welded, is hereinafter referred to as the plate.

According to the invention, a construction of stud moving and arc striking device is provided in which the movement of the stud from the plate for the striking of the arc is effected by electrical means and the return movement of the stud to the plate is effected pneumatically or under fluid pressure. For this purpose, according to the invention, the device may comprise a coupled solenoid core and piston operating respectively within a solenoid and cylinder disposed in tandem fashion, and the admission of air or fluid pressure to the cylinder may be effected by means of a valve which is advantageously controlled electrically as by means of a solenoid.

The invention broadly comprises the various features of method and apparatus as hereinafter described.

Apparatus provided in accordance with the invention is illustrated in the accompanying drawings by way of example:

Figure 1:
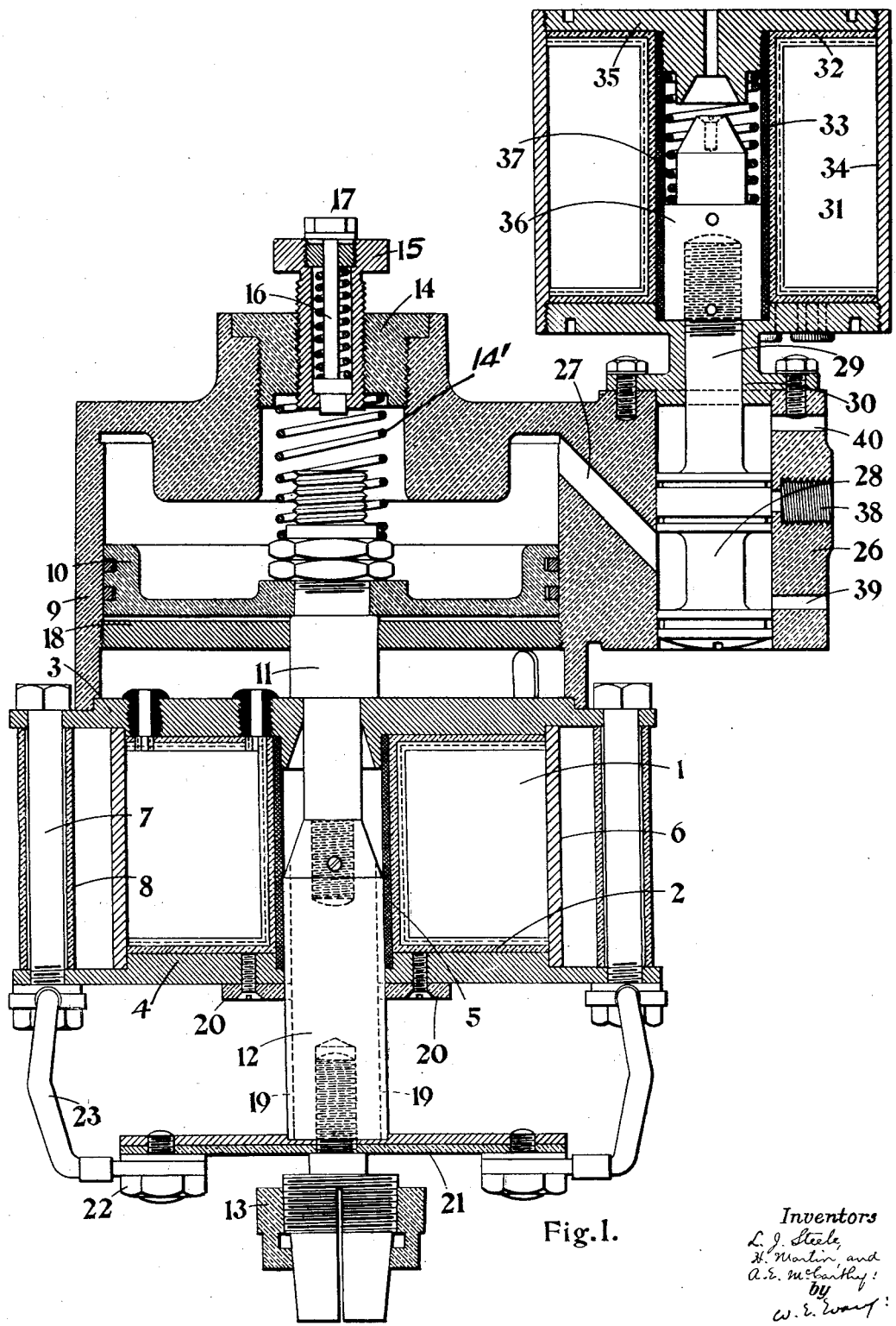
Figure 1 is a sectional elevation of a stud moving and arc striking device in which the movement of the stud for striking the arc is effected electrically and the return of the stud to the plate is effected pneumatically or by fluid pressure.
Figure 2:
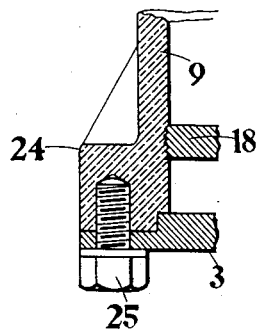
Figure 2 is a sectional detail of construction of the device represented in Figure 1.
Figure 3:
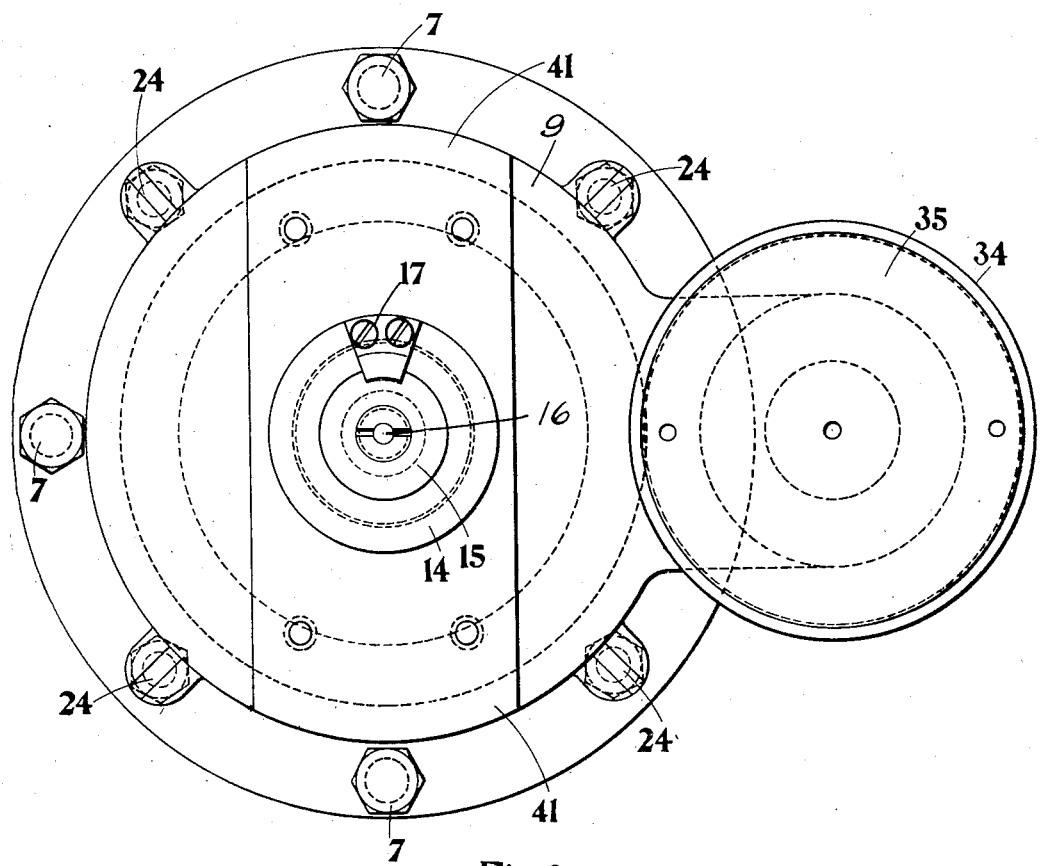
Figure 3 is a plan of the device represented in Figure 1.
Figure 4:
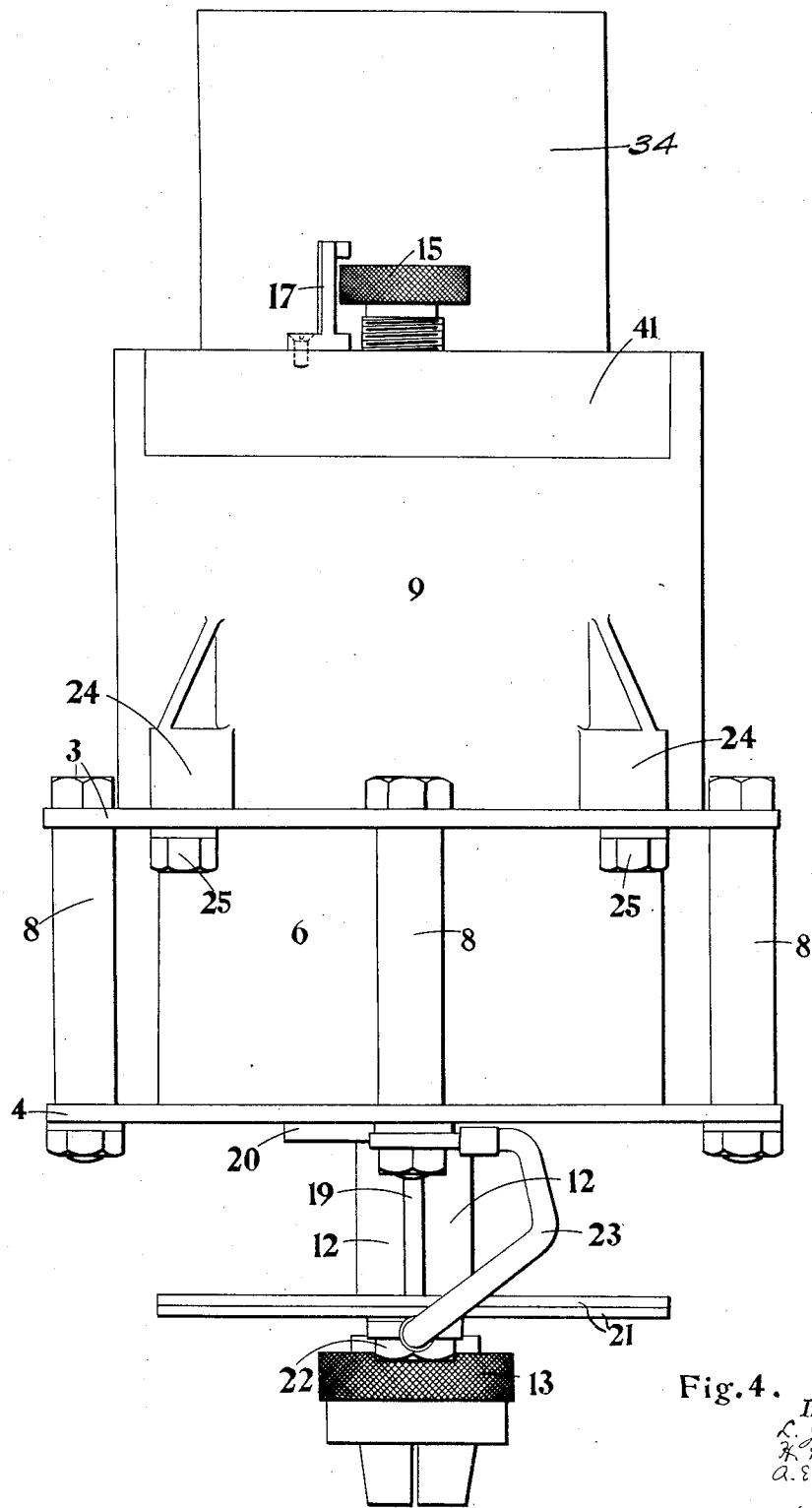
Figure 4 is an elevation of the device represented in Figure 1 viewed at right angles.

The apparatus broadly comprises two parts. The first, a stud moving and arc striking device, the second, a controlling and timing apparatus, which ensures that the period of the arc is automatically maintained at any desired predetermined value until the apparatus is re-set.

The following is a description of an apparatus provided according to the invention having a stud-moving device in which the stud is moved away from the plate by electro-magnetic means and returned to the plate by pneumatic means, under electrical and pneumatic control, whereby the stud is moved for striking the arc without vibration or hammering. In this apparatus the air pressure is only permitted to operate on the upper side of the piston, the under-side of the cylinder being open to atmosphere. To the under-side of the cylinder is attached a solenoid through the centre of which passes the piston rod at the end of which is attached the stud holder. The use of pneumatic pressure to return the stud to the plate ensures the weld being made under adequate pressure without hammering. This may be most conveniently and simply done by the control of the pressure fluid, as, for example, by admitting it into the cylinder through an orifice of small dimensions, so that thus the piston is subjected to the full pressure only in the later part of its stroke. It is, however, necessary that excessive pressure should not be used, as otherwise an ineffective and brittle weld would result. This piston rod, is, however, in this case of composite construction, of magnetic and non-magnetic materials and so designed that its lower portion becomes the magnetic core of the said solenoid which when it is energized moves the stud away from the plate, thereby striking the arc. The solenoid may be of either the shunt or series type. Though the use of the latter simplifies the control connections, the strength of the resulting movement is obviously in proportion to the current which passes through the coil, this being in the case of the series coil the main welding current. With apparatus in which there are likely to be large variations in size of the studs to be welded and consequently of the welding current required, it is preferred to use a shunt solenoid which is energized independently of the welding current.

In the stud welding apparatus now being described, it will be seen that only one valve is required for supplying compressed air to or releasing it from the upper side of the piston. This control valve connects to the air supply or atmosphere on one side, and to the stud moving device on its other side, is of the piston type and is operated by means of a solenoid, which when energized lifts the valve thus admitting compressed air to the cylinder of the stud moving device. This valve is returned to and retained in its normal or lower position by means of a suitably housed spring and when in this position connects the cylinder of the stud-moving device to atmosphere.

Suitable arrangements are provided for regulating the air pressure supplied to the stud-moving device.

In the construction of apparatus shown in Figures 1 to 4 of the accompanying drawings, the arc striking solenoid has the coil or windings 1 suitably mounted upon a spool 2 and enclosed in a casing comprising upper and lower plates 3, 4, respectively, an inner wall 5 of non-magnetic metal or other suitable material, and an outer wall or casing 6. The upper and lower plates 3 and 4 are secured together by means of bolts 7 passing through distance tubes 8. Co-axial with the solenoid there is mounted a cylinder 9, closed at the outer end, which serves as the cylinder for the application of pneumatic or fluid pressure for the purpose of returning the stud into contact with the plate. A piston 10 suitably provided with packing rings is mounted upon a piston rod 11 which extends through the upper plate 3 of the solenoid and serves to receive the core 12 of the solenoid at the lower end of which is carried the chuck 13 for the stud. The piston rod 11 is advantageously provided of non-magnetic metal or of other suitable material. The piston is conveniently secured upon the piston rod by the provision of a shoulder upon the rod adjacent the inner face of the piston and by the provision of a nut and lock-nut screwing upon the threaded outer extremity of the rod which extends upwardly to a suitable distance.

In the closed end of the cylinder 9 there is mounted a bush 14 which serves as one seat for a spiral spring 14' adapted to surround the outer end of the piston rod 11 and to rest upon the lock-nut before referred to, the purpose of the spring being to cushion the piston to ensure good contact between the stud and the plate before the solenoid is rendered active. A screwed plug 15 is co-axially mounted in the bush 14 and serves as a cylinder to receive a plunger 16 mounted under spring action and extending inwardly beyond the end of the plug 15 to a distance corresponding to the exact length of arc which is desired upon striking. The outer end of the plug 15 is provided with a flange which is embraced by a bracket-like member 17 serving to determine the extreme positions of adjustment of the plug 15 with reference to the cylinder 9. It will be understood that, according to the initial position of the piston 10 after the apparatus has been set with the stud in position upon the plate, the length of the arc desired can be determined by screwing the plug 15 inwards until the inner end of the plunger 16 contacts with the end of the piston rod; thus the piston rod can only move upwardly to the extent determined by the projecting portion of the piston 16.

The cylinder 9 does not require to be closed on the inner end and may be provided with free access to the atmosphere. It is advantageous, however, to provide a partition member or plate 18 which, however, may be perforated or provided to be a loose fit around the piston rod.

The solenoid core 12 is advantageously screwed upon the extremity of the piston rod 11 and secured thereto by such means as a grub screw. The inner end is preferably of conical form and the bore in the upper plate 3 is advantageously formed to correspond.

In order to prevent a rotational movement of the core longitudinal grooves 19 are advantageously provided in diametrical positions and are engaged by an annular guide plate 20 or plates secured to the lower plate 4. At the outer end of the core there is mounted a compound disc 21, comprising a plate or steel above a plate of brass, to which are secured two studs 22 which are connected by leads 23 to the adjacent bolts 7, such arrangement serving to shield the arc from magnetic effects of the solenoid and as a means for the transmission of the welding current to the stud, without relying upon the transmission of current through the core 12.

The cylinder 9 may be fitted in any suitable manner to the solenoid casing; thus, it may be screwed to engage a flange or rim upon the upper plate 3. In the construction illustrated, however, the cylinder is provided with a number of lugs 24 in which are received screws 25 which pass through the upper plate 3.

The valve for controlling the admission of air or fluid pressure to the cylinder may be of any suitable construction and may be disposed in any suitable manner with respect to the cylinder. Similarly, the manner in which the electrical operation of the valve is effected may be varied. As shown in the drawings, however, the cylinder 9, is formed with or has fitted to it a laterally disposed valve cylinder 26 with the bore of which communication is established by a passage 27. A piston valve 28 with two pistons is disposed in the bore of the cylinder 26 and is provided with a piston rod 29 which extends upwardly through a cylinder cover 30 conveniently formed also as the lower plate of a casing for a solenoid winding 31 by which the valve may be operated.

The said winding 31 is suitably fitted upon a spool 32 which rests upon the said lower plate and is enclosed by an inner tube 33 of nonmagnetic metal or other suitable material and an outer covering 34 which fits upon the lower plate and is adapted to receive the upper plate 35. The solenoid core 36 is mounted upon the piston rod 29 as by means of a screw thread and is formed with a portion of reduced diameter at its inner end to permit a helical spring 37 to be mounted between the upper plate 35 and the portion of the core of greater diameter. The extremity of the core may conveniently be of conical form and the inner central portion of the plate 35 may be similarly formed and provided with an axial hole to permit of the escape of air. The cylinder 26 is provided with an inlet port 38 suitably formed for the reception of a socket or union for connection to a source of air or fluid pressure supply and towards the lower end the cylinder is provided with a port 39 for the escape of air from the cylinder 9, while at the upper end the cylinder 26 is provided with a port 40 permitting the escape of air trapped therein by the piston valve 28.

The apparatus may be provided for use under various conditions. Thus, it may be fitted for mounting upon the spindle of a drilling machine or other machine tool, and for this purpose there may be mounted upon the surface 41 a bracket suitably formed or provided with a socket adapted to fit the spindle.

The stud-moving device may otherwise be attached to, though insulated from, a movable spindle or slide mounted on suitable supports. The single electrically operated valve is preferably directly connected to or mounted upon the stud-moving device, and the compressed air supply to the valve is effected by means of suitable flexible piping.

The automatic control and timing apparatus (Figures 5 and 6) comprises a cam shaft 50, carrying cams 49, 59, 63 and 66 and rotated from a spring motor 70 provided with a governor 71. The motor 70 is normally prevented from rotating the cam shaft 50 by a brake solenoid 47, the core of which is connected to a lever 72 carrying a brake block 73 adapted to engage the governor disc 74.

The evolute cam 59 which is in circuit with the main contactor control coil is provided with an insulated adjustable contact member or finger 58 which travels in a vertical direction and also is weighted to give the desired contact pressure. The adjustment of this contact member or finger 58, in order to regulate the period of the arc, is effected by means of another cam 67 which may be called the time adjustment cam, and which limits the travel of the contact finger 58 towards its contact making cam 59. The time adjustment cam is attached to a spindle 68 at the outer end of which is fixed an engraved dial 69 which can be readily rotated by hand and left locked in any desired position, the whole design being such that the markings on the dial when brought opposite to a fixed pointer on the casing of the apparatus accurately indicate the time period for which the arc is maintained with this setting or adjustment.

Figure 5:
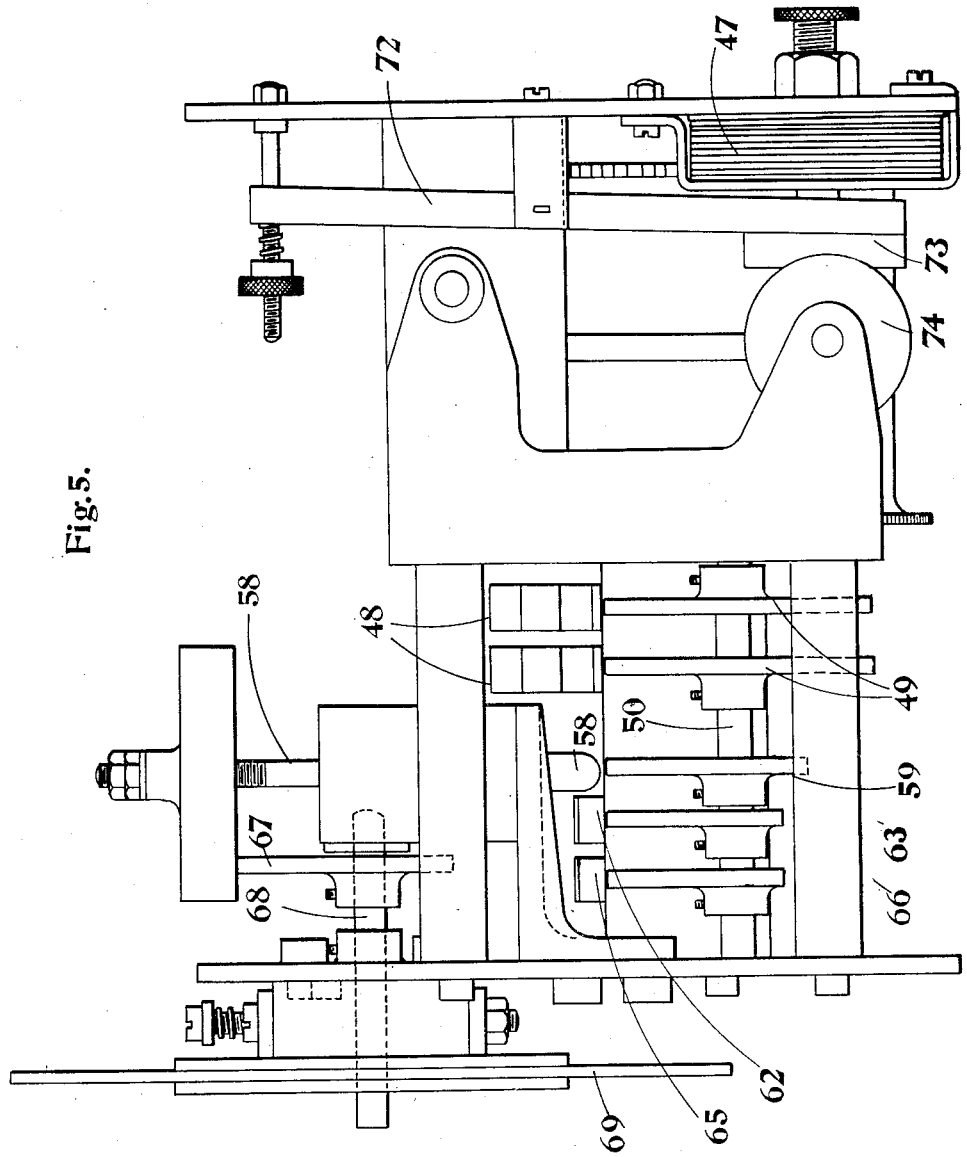
Figure 5 is an elevation of an automatic control and timing apparatus for use with the apparatus shown in Figures 1 to 4.
Figure 6:
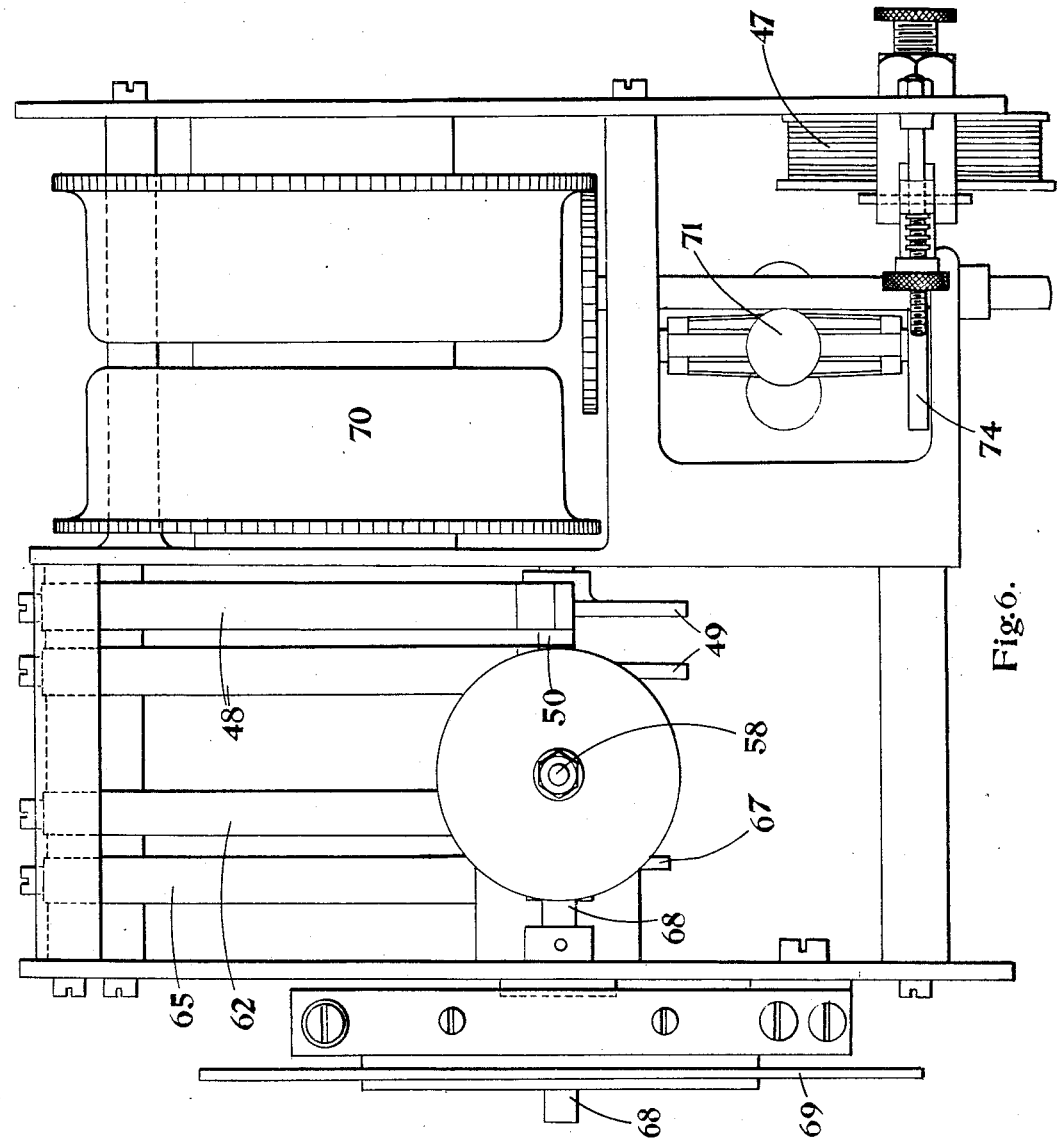
Figure 6 is a plan view corresponding to Figure 5.
Figure 7:
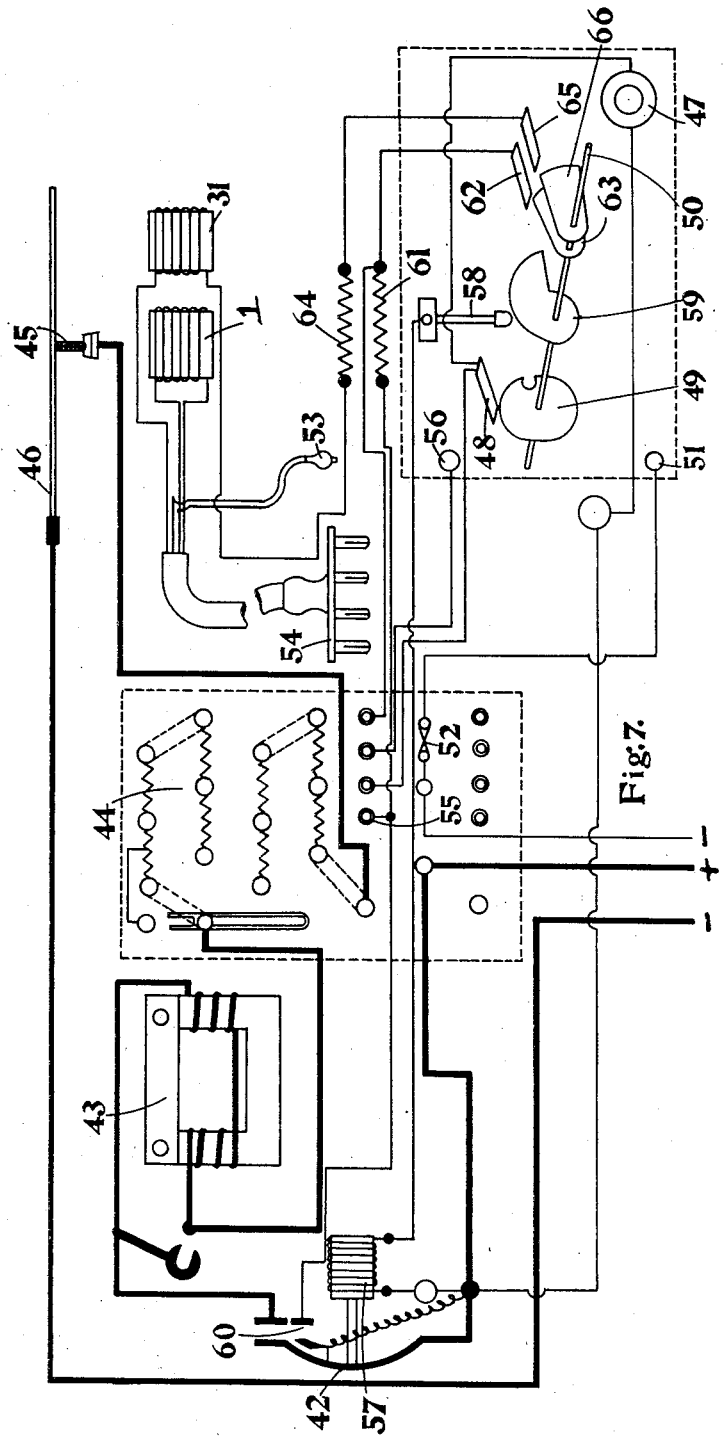
Figures 7 and 8 are diagrams of electrical connections in respect of the device represented in Figures 1 to 4 when used with an automatic control and timing apparatus such as that represented in Figures 5 and 6.

Referring to Figure 7 of the accompanying drawings, which is a diagram of connections for the apparatus shown in Figures 1 to 4 with the automatic control and timing apparatus shown in Figures 5 and 6, except that for simplicity the cams 49 and contact fingers 48 are represented as a single set, it will be observed that the positive terminal of the main welding circuit is connected through a magnetically operated contactor 42, a reactance coil 43, a rheostat 44 and thence to the stud 45, and that the plate 46 to which the stud is to be welded is connected to the negative terminal. Parallel control circuits are carried from the positive side of the contactor 42, one serving for the operation of a brake solenoid 47 for the automatic control and timing apparatus and being carried thence to the contact brush 48 adapted to contact with the cam 49 mounted on the spindle 50 of the automatic control and timing apparatus, the circuit being then led from a terminal 51 on the framework of the apparatus and through a fuse 52 to a negative terminal. The cam 49 is gapped so that after one rotation of the spindle 50 the circuit for the solenoid 47 is broken and the operation of the apparatus arrested. For the purpose of starting the apparatus a push button switch 53 is provided, the leads of which, in common with leads for the arc striking solenoid 1 and valve solenoid 31, are carried through a flexible cable to a plug fitting 54 adapted for connection to socket fittings 55 whence one of the push button leads is connected with the contact brush 48, while the other lead is connected to a terminal 56 upon the frame work of the automatic control and timing apparatus and thus to the negative terminal.

A second control circuit, which passes through the coil 57 of the electro-magnetic contactor 42, is carried to the vertically adjustable contact finger 58, which engages the cam 59 on the spindle 50 of the automatic control and timing apparatus, and thus serves at a particular moment in the rotation of the spindle 50 to close the main welding circuit through the contactor 42, the control circuit being completed to the negative lead through the terminal 51.

Figure 8:
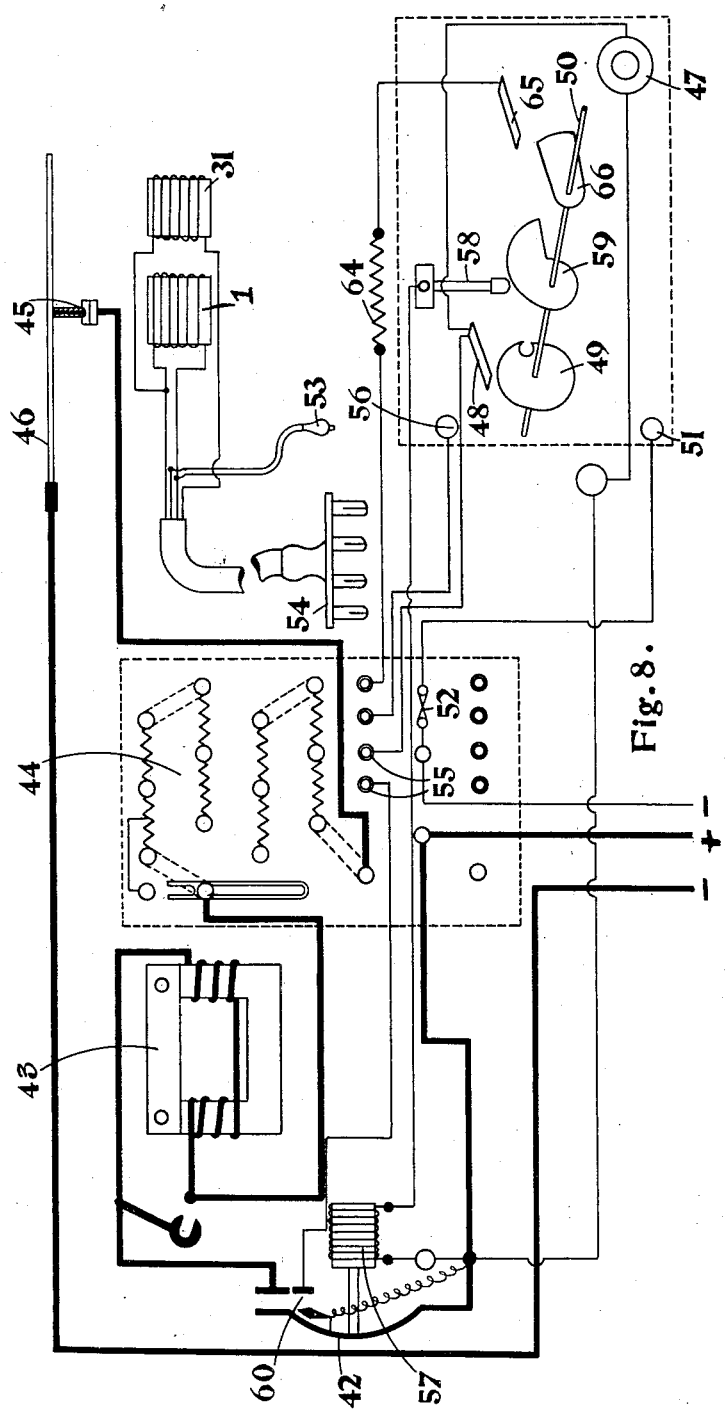

An auxiliary switch 60 closed by the contactor 42 serves to close a circuit through the arc-striking solenoid 1, by way of the non-inductive resistance 61 and the fourth socket 55 and returning by the third socket to the terminal 56 and thus by way of the terminal 51 to the negative lead. A branch circuit is formed at the non-inductive resistance 61 to a contact brush 62 adapted to contact with a cam 63 upon the spindle 50 at a determined moment and thus to act as a shunt to the solenoid 1 when the latter is required to be de-energized. The circuit through the valve solenoid 31 is also completed by the switch 60 by way of the first socket 55 and through a non-inductive resistance 64 to a contact brush 65 adapted to engage a cam 66 upon the spindle 50 at a determined moment in the rotation of the shaft.

Where desirable the arc-striking solenoid 1 may be maintained active and be overpowered by the piston 10 when the stud is returned to the plate. The connections are then as represented in Figure 8 of the drawings: They are substantially the same as in Figure 7 with the exception that there is no shunt to the arc-striking solenoid 6.

As illustrated, means may be provided for short-circuiting the reactance 43.

In operation, assuming that the stud-moving device has been fixed in position with the stud 45 against the plate 46, and that the necessary preliminary adjustments for the current and timing and length of arc have been made, the automatic timing and control apparatus is started by means of the push button or switch 53, or in some other equally effective manner, and during the resulting rotation of the cam spindle 50, the following sequence of operations takes place:

1. The circuit of the contactor operating coil 57 is closed, thereby closing the main circuit through the stud and plate by means of the contactor 42.

2. The solenoid of the stud-moving device is energized as the result of the closing of the switch 60 by the contactor 42 thus moving the stud away from the plate and striking the arc. Further, as the switch 60 is in circuit with the solenoid 31 the latter is made ready to be energized on the engagement of the cam 66 with the contact finger 65.

3. The solenoid 6 of the stud-moving device is de-energized by being short circuited or shunted at the timing apparatus by the cam 63 and contact brush 62.

4. (Which is practically co-incident with 3). The air control valve solenoid 31 is energized, thus lifting the valve 28 and admitting compressed air to the cylinder 9 of the stud-moving device, thereby forcing the molten end of stud into or on to the molten plate to which it becomes welded.

5. The contactor control circuit is opened through the cam 59 and contact 58 so that the contactor 42 opens the main welding circuit through the stud and plate and the switch 60 in consequence also opens the parallel circuits through the non-inductive resistance 61 of the solenoid 1 and the short circuiting cam 63 and contact brush 62 of the timing apparatus, and through the valve solenoid 31, thus de-energizing the solenoid 1 and permitting the valve to move to cut off the air supply to the cylinder 9 of the stud-moving device.

6. The short circuiting cam 63 passes out of contact with its contact brush 62 thereby removing the short circuit from the solenoid 1 of the stud-moving device.

7. The circuit of the electrically-operated air valve solenoid 31 is additionally opened through the separation of the cam 66 from the contact brush 65.

8. The control and timing apparatus brake solenoid circuit is opened by the passage of the gap in the cam 49 in front of the contact brush 48, thereby permitting the brake to stop the apparatus after one complete revolution in the same position as that from which it started.

The stud-moving device is finally released and withdrawn from the stud which has been welded to the plate.

For the purpose of welding long bars or tubes and the like, it may be necessary to pass these through the centre of the stud-moving device, and in such case the stud-moving device is preferably provided with a hollow piston rod at the end of which is attached the stud holder. As the use of such a hollow piston rod involves modifications in the design of the stud-moving device described, such as the provision of additional glands and an alteration in the arrangement of the arc-striking and limiting device, alternative arrangements have to be adopted. These arrangements require:—

(a) The stud holder to be fixed at the end of a hollow circular rod, the latter being free to slide in a suitable guide or guides and the necessary movements of the stud being effected by mechanically connecting the outer end of the piston rod of a stud-moving device such as that described by means of a suitable lever or levers and accessories to the aforementioned hollow rod to which the stud welder is attached.

(b) A hollow rod carrying a stud holder and sliding in guides similar to that in (a) may be fitted with a cross bar at either end of which is attached the piston rod of a stud-moving device such as those previously described, which in this case would be required to operate in pairs in parallel.

To facilitate welding by the method or means of this invention, more particularly when steel and iron studs have to be welded, brass rings or bushes may be fitted at the welding ends of the studs with a short length of the stud projecting. In use these rings appear to steady the arc, enlarge the crater or molten metal and generally facilitate the making of welds, which are free from blowholes or other defects, especially with small studs. The welding of small studs can also be facilitated by making them hollow, that is, in the form of thick tubes either throughout their length or simply adjacent to the weld. Though a smaller cross sectional area of metal is obviously thus obtained at the weld, this is compensated for by the quality of the weld and the greater facility with which it is made.

The insertion of a small disc or ball of brass or other suitable metal between the stud and plate immediately before making a weld, particularly in the case of steel stud welding, is advantageous to prevent any tendency of the stud to become tacked to the plate when the welding circuit is first closed. At the same time the use of a disc or ball in this manner renders it possible to vary the quality of the weld, if necessary, by making additions of metal or other substances to it.

It will be understood that the invention is hereinbefore described in terms involving reference to actual constructional embodiments of the invention and that the invention is not limited thereto.

The invention is applicable to the production and manufacture of cinematograph reels, parts of motor road vehicles, ferrules for umbrellas and sticks, fishing or other reels, parts of aeroplanes, parts and terminals of electrical apparatus, as well as for numerous applications to ships and other general purposes in the arts.

We claim:

1. Apparatus for electric arc welding of metallic elements, such as studs, to metallic bodies, comprising an electric welding circuit in which are included the metallic element and the metallic body, a holder for the metallic element, electro-magnetic means to move said holder to withdraw the metallic element from the metallic body, means operating under fluid pressure to move the holder to return the metallic element into contact with the metallic body, and means respectively to control the operation of the electro-magnetic means and the means operating under fluid pressure, said welding circuit being closed before the electro-magnetic means are energized.

2. Apparatus for electric arc welding of metallic elements, such as studs, to metallic bodies, comprising an electric welding circuit in which are included the metallic element and the metallic body, a holder for the metallic element, a solenoid with core, a cylinder, a piston within said cylinder, a piston rod connected to said piston, said holder, solenoid core and piston rod operating as a single unit, means for energizing the solenoid after the welding circuit has been closed for the withdrawal of the metallic element from the metallic body to strike an arc and for de-energizing the solenoid, and means for admitting fluid under pressure to said cylinder to move said piston to return the metallic element into contact with the metallic body.

3. Apparatus for electric arc welding of metallic elements, such as studs, to metallic bodies, as set forth in claim 2, wherein said means for admitting fluid under pressure to said cylinder comprise a valve and means for automatically operating said valve.

4. Apparatus for electric arc welding of metallic elements, such as studs, to metallic bodies, as set forth in claim 2, wherein said means for admitting fluid under pressure to said cylinder comprise a valve, admission and exhaust ports for the fluid controlled by said valve, and electro-magnetic means for moving said valve with respect to said ports.

5. Apparatus for electric arc welding of metallic elements, such as studs, to metallic bodies, comprising an electric welding circuit in which are included the metallic element and the metallic body, a holder for the metallic element, electro-magnetic means to move said holder to withdraw the metallic element from the metallic body, means operating under fluid pressure to move the holder to return the metallic element into contact with the metallic body, a valve controlling the supply of the fluid under pressure, electro-magnetic means for operating said valve and an automatic control and timing apparatus comprising a number of contact closing and breaking devices respectively included in the circuits of the electro-magnetic means operating the holder and the electro-magnetic means operating the said valve, said contact closing and breaking devices operating in sequence.

6. Apparatus for electric arc welding of metallic elements, such as studs, to metallic bodies, as set forth in claim 2, comprising also automatic control and timing apparatus provided with a contact making and breaking device applied to the welding circuit, a contact making device for energizing the solenoid, a contact device for de-energizing the solenoid and a control device applied in respect of the fluid supply, said devices being operated in sequence.

7. Apparatus for electric arc welding of metallic elements, such as studs, to metallic bodies, as set forth in claim 6, having means to permit adjustment of the duration of the arc and the continuance of the closure of the welding circuit, said means comprising a pair of relatively movable contact members included in each circuit concerned, one of said contact members being adjustable in position with reference to the path of the other relatively thereto, for variation of the period of contact.

8. Apparatus for electric arc welding of metallic elements, such as studs, to metallic bodies, as set forth in claim 6, wherein the automatic control and timing apparatus comprises a travelling member, a series of pairs of contact members, one member of each pair being moved with the travelling member and the other member of each pair being of fixed position, a motor giving movement to the said travelling member, a braking element to restrain the movement of said travelling member, means to release said braking element, and means to render said braking element inoperative while the travelling member completes a predetermined movement.

9. In apparatus for electric arc welding of metallic elements, such as studs, to metallic bodies, an automatic control and timing apparatus comprising a rotatable spindle, a motor for driving the said spindle, a motor control plate carried by the said spindle and serving automatically to arrest the operation of the motor, electric circuit controlling cams carried by the spindle for engagement with corresponding contacts, and adjustable cam devices engaging and adjusting the position of said contacts to permit regulation of the period of engagement of the controlling cams with the said contacts.

10. In automatic control and timing apparatus applied to apparatus for electric arc welding of metallic elements, such as studs, to metallic bodies, as set forth in claim 9, the provision of a rotatable spindle, a cam mounted upon the said spindle, a slidable contact member to engage and be moved by the said cam, and an adjusting member applied to said slidable contact member to position it at a variable distance from the said cam.

11. Apparatus for electric arc welding of metallic elements, such as studs, to metallic bodies, comprising an electric welding circuit which includes the metallic element and the metallic body, a holder for the metallic element, a solenoid with core, a cylinder, a piston within said cylinder, a piston rod connected to said piston, said holder, solenoid core and piston rod operating as a single unit, means for energizing the solenoid after the welding circuit has been closed for the withdrawal of the metallic element from the metallic body to strike an arc, a valve chamber communicating with the said cylinder, a pressure fluid admission orifice of restricted area leading to said valve chamber, a valve in said valve chamber to admit pressure fluid to the cylinder to move the piston to return the metallic element into contact with the metallic body, and means to effect movement of the said valve.

12. Apparatus for electric arc welding of metallic elements, such as studs, to metallic bodies, comprising an electric welding circuit which includes the metallic element and the metallic body, a holder for the metallic element, a solenoid with core, a cylinder, a piston within said cylinder, a piston rod connected to said piston, said holder, solenoid core and piston rod operating as a single unit, an adjustable piston stop coaxially disposed upon said cylinder, a slidable plunger in said adjustable piston stop and protruding therefrom, said adjustable piston stop being adapted for movement to bring said plunger into contact with the piston rod and said plunger determining by its protrusion from the stop the arc length, means for energizing the solenoid after the welding circuit has been closed for the withdrawal of the metallic element from the metallic body to strike an arc, and means for admitting fluid under pressure to said cylinder to move said piston to return the metallic element into contact with the metallic body.

LOUIS JOHN STEELE.
HAROLD MARTIN.
ANDREW EDWARD McCARTHY.